(12) United States Patent
Schmerler

(10) Patent No.: US 10,252,489 B2
(45) Date of Patent: Apr. 9, 2019

(54) SYSTEM AND METHOD FOR EMBEDDING A COMMUNICATION DEVICE INTO CARBON FIBER STRUCTURES

(71) Applicant: Jurgen Schmerler, San Diego, CA (US)

(72) Inventor: Jurgen Schmerler, San Diego, CA (US)

(73) Assignee: Verifir, Inc., Solana Beach, CA (US)

( * ) Notice: Subject to any disclaimer, the term of this patent is extended or adjusted under 35 U.S.C. 154(b) by 0 days.

(21) Appl. No.: 15/705,206

(22) Filed: Sep. 14, 2017

(65) Prior Publication Data

US 2019/0077117 A1    Mar. 14, 2019

(51) Int. Cl.
| | |
|---|---|
| *G06K 19/00* | (2006.01) |
| *B32B 7/02* | (2019.01) |
| *B32B 9/00* | (2006.01) |
| *B32B 17/04* | (2006.01) |
| *B62K 19/02* | (2006.01) |

(52) U.S. Cl.
CPC ............... *B32B 7/02* (2013.01); *B32B 9/007* (2013.01); *B32B 17/04* (2013.01); *B32B 2305/342* (2013.01); *B32B 2307/206* (2013.01); *B62K 19/02* (2013.01); *B62K 2207/00* (2013.01)

(58) Field of Classification Search
CPC ....................................................... G06K 19/00
USPC .................... 235/488, 492; 340/572.1–572.9
See application file for complete search history.

(56) References Cited

U.S. PATENT DOCUMENTS

| | | | | |
|---|---|---|---|---|
| 2006/0255945 | A1* | 11/2006 | Egbert ............. | G06K 19/07749 340/572.7 |
| 2007/0273532 | A1* | 11/2007 | Martin .................... | G06K 19/04 340/572.7 |
| 2009/0015431 | A1* | 1/2009 | Hamedani .............. | G06K 19/02 340/8.1 |
| 2017/0068437 | A1* | 3/2017 | Warren ............... | G06F 3/04883 |

* cited by examiner

*Primary Examiner* — Daniel A Hess
(74) *Attorney, Agent, or Firm* — David B. Waller

(57) ABSTRACT

A remote frequency communication device is embedded into a physical product build from carbon fiber materials whereby the communication device can interact with an interrogation device such as a mobile phone or tablet. The present invention specifies a method to layer the communication device in a way that prevents the conductive carbon fiber material from short-circuiting the electro-magnetic field of the interrogating device by integrating insulating and protective layers around the communication device.

4 Claims, 6 Drawing Sheets

SYSTEM AND METHOD FOR EMBEDDING A COMMUNICATION DEVICE INTO CARBON FIBER STRUCTURES

CROSS-REFERENCE TO RELATED APPLICATIONS

This application claims benefit of priority under 35 U.S.C. § 119(e) to Provisional Application No. 62/394,613, entitled "System and Method for Embedding a Communication Device into Carbon Fiber Structures," filed Sep. 14, 2016, which is incorporated by reference herein in its entirety.

FIELD OF INVENTION

The invention generally relates to the connection of physical objects to wireless communication devices via systems of integrated circuits and antennas using remote frequency. Communication and follow-up of interactions between physical objects, object users, and Internet services can add enormous value to the usefulness of the physical object, such as a product or product sample, for example.

BACKGROUND OF THE INVENTION

With the ability of cheaper technologies to connect computing devices to the internet, many attempts have appeared recently to connect more and more devices online. Beyond traditional client computers and servers, the Internet connects today many other forms of computing devices, such as cell phones, tablet computers, and printers. Beyond these wired or wireless connections, many manufacturers are trying to provide added value to their products by connecting them online. Examples include thermostats, temperature and weather stations, door locks, cameras, and even refrigerators. These types of connections are commonly referred to as the "Internet of Things" (IoT) and typically use WiFi and/or Ethernet networks in homes and businesses. Alternative connectivity technologies include Bluetooth, fixed wiring, Remote Frequency (RF) connections with dedicated hubs, or cellular networks.

Most recently, the broad availability of RFID technologies, in particular Near Field Communication, or NFC, in most commercial cellular phones, combined with a low cost factor, made NFC one of the most prominent alternatives to connect physical objects to communication devices, such as cellular phones.

While commercial NFC circuits and antennas, or NFC tags, can be easily applied to most materials products are made of, they face technical difficulties if the materials adjacent to the antenna competes with the antenna to conduct the electro-magnetic field of the external interrogating communication device, such as a cell phone. These materials include conductive metals and conductive carbon fiber structures.

This invention teaches how to embed the communication device, such as an RFID tag, with a carbon fiber-based material without the existing draw backs that lead to inability to use or severe performance loss of the communication device.

SUMMARY OF INVENTION

This invention addresses the process of embedding a communication device [302], such as an RFID or NFC chipset, into products that consist of layers of carbon fibers [301]. It addresses the problem of short-circuiting [FIG. 3A] such devices' electromagnetic fields [304] due to the conductive properties of carbon fibers [301].

The invention was conceived while solving to attach and embed NFC chipsets to carbon-based materials, such as carbon bicycle frames. A simple attachment on top or inside carbon fibers would result in short circuiting [305] of an electromagnetic field built by an interrogating device [303], resulting in insufficient signal strength and power supply to the communication device [302].

The application of such embedded communication devices is, for instance, an anti-counterfeiting system, where the communication device contains a memory chipset and a metal antenna with product identity information that can be read by a cell phone with NFC reading capabilities.

This invention addresses several shortcomings of current state-of-the-art methods in a specific environment:
1. Carbon fibers react to electro-magnetic fields very much like metals. A field is short-circuited [305] by the material [301] that carries the communication device and its antenna [302].
2. To prevent the short-circuiting [FIG. 3B], an additional insulation layer [310], of for instance a non-conductive poly-carbonate or ferrite, has to be inserted between the carbon carrier material [301] and the communication antenna [302].
3. The resulting build-up of insulation layer [310], communication device [302], and protective materials would protrude above the carbon-based product, making it undesirable in terms of product fit (integration), integrity of additional coatings, optical form factors, or adherence of the communication device to the product.

This invention includes a method of integrating the communication device under the surface of the final carbon-based form, while insulating the antenna, during the manufacturing process [FIG. 5]. Specific problems are solved with regard to carbon forming, curing temperatures and times, as well as chipset protection.

The system and method described in this application consists of multiple elements:

Device

First, a communication device is chosen with regard to final product form factors, desired reading device (interrogator) capabilities, and read ranges [500]. In one embodiment, the communication device can comprise an NFC IC chip, such as NTAG213, and a coiled or printed metal antenna on a carrier film.

Insulation Layer

Second, the communication device is mounted on an insulation layer of a non-conductive material, like ferrite, the area and thickness derived from final product form requirements and readability requirements [502]. In one embodiment, the insulation material is a high frequency absorbing, 0.25 mm thick ferrite sheet with high permeability. The insulation layer [310] is suitable for absorbing frequencies used by the communication and interrogating devices, for instance 13.52 MHz in the case of NFC radio frequency. This permeability absorbs [312] the elements of the electromagnetic field that would otherwise short circuit [305] the interrogator [303]/communication device [302] field interaction.

Third, the final product molding process is adopted to assure proper fit of the communication device. Specifically, the sequence of layering a protective layer of, for instance, one or more sheets of fiber-glass [504], followed by the communication device and its insulation layer [506], and finished by the desired depth of carbon fiber layers [508].

Fourth, the expandable inner-mold tubing is inserted into the mold to enable proper inner pressure to avoid damaging the communication device during the curing process [510].

Fifth, the molding curing is framed by choosing proper temperatures and curing times to avoid damage to the communication device [520].

Sixth, after the product is cured and removed from the mold [522], the product is finished through abrasion or additional final coatings to avoid damage to the communication device [524].

The carbon-based product is now equipped with the embedded communication device that can be read by the interrogator. The communication device is protected from product use and tempering and can be made invisible through paint or other non-carbon and non-metallic coatings without the loss of communication properties.

One of the most important and novel aspects of this invention is the combination of materials not suited for remote frequency communication with near field communication devices.

DETAILED DESCRIPTION OF EXEMPLARY EMBODIMENTS OF THE INVENTION

Figure 1:
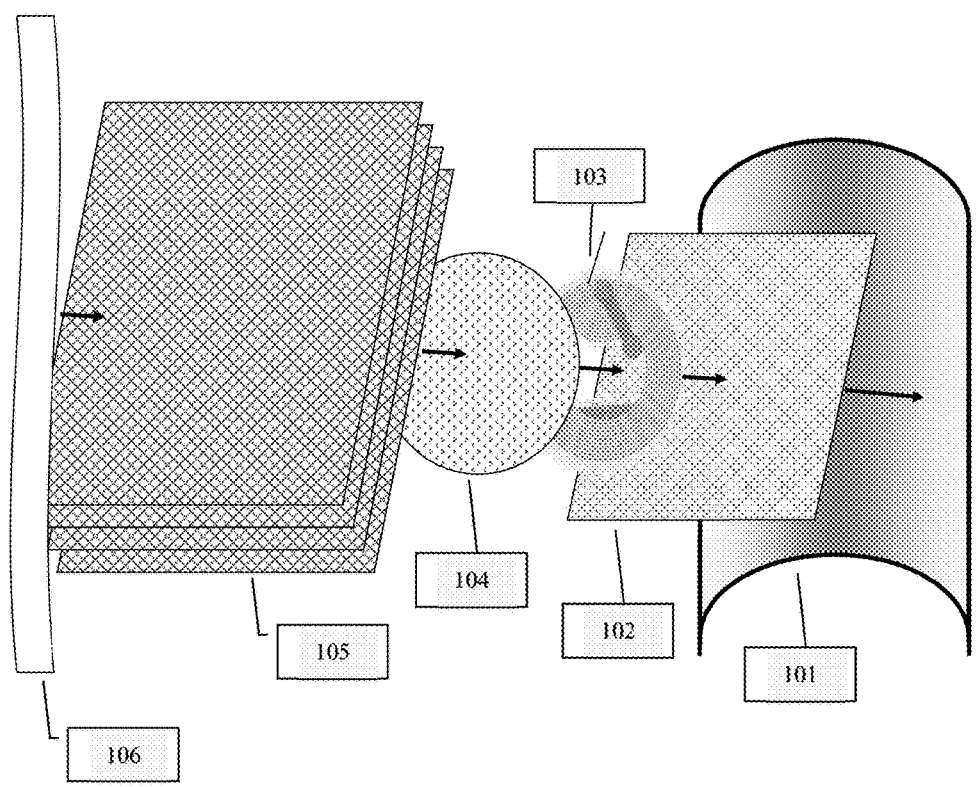
FIG. 1 is an illustration of an exemplary in-mold layering of the communication device and the carbon fibers.
Figure 2:
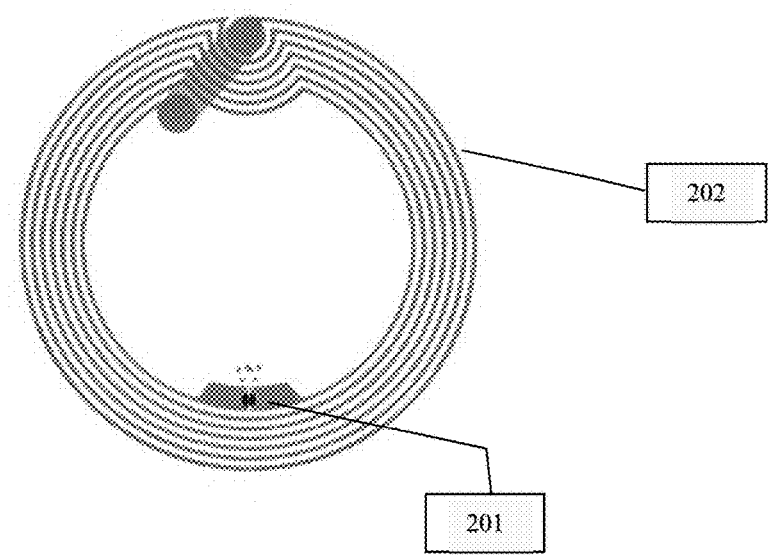
FIG. 2 is an illustration of a Near Field Communication device, or NFC tag, including an integrated circuit and an antenna.
Figures 3A, 3B:
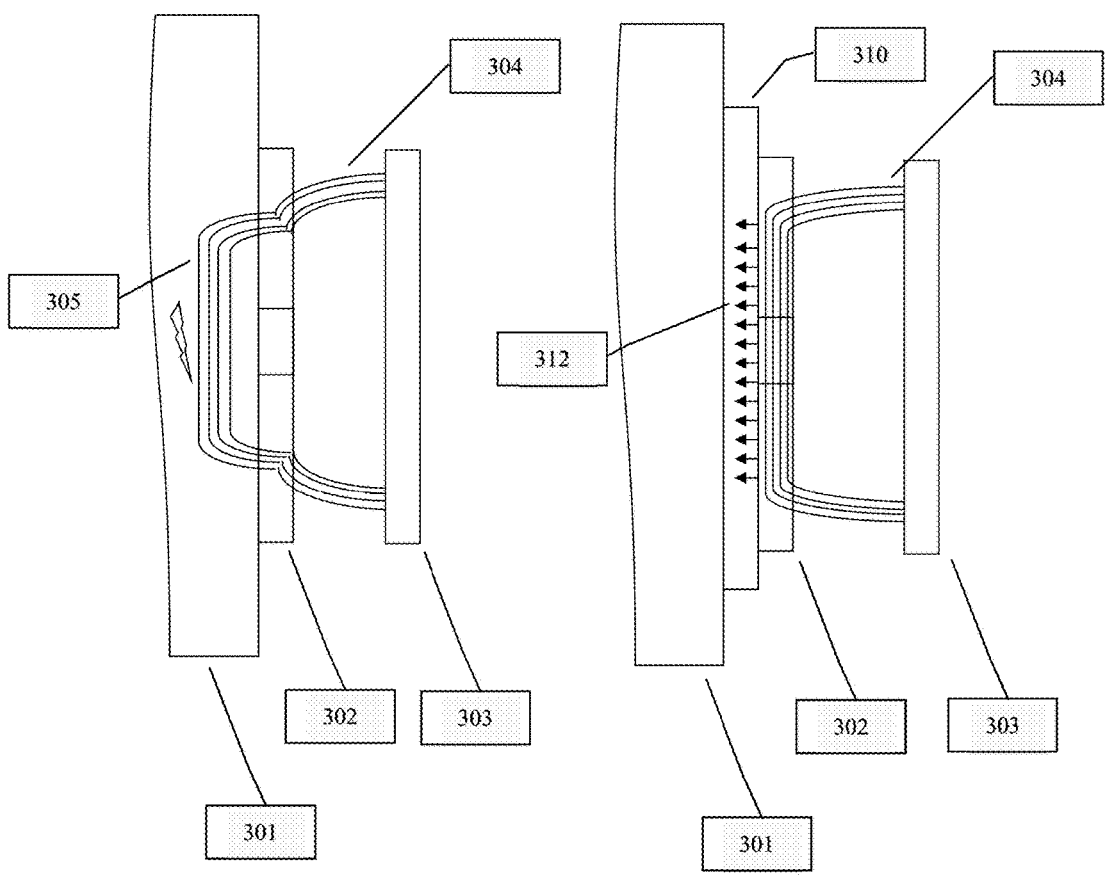
FIGS. 3A and 3B illustrate how an electro-magnetic field used for remote frequency communication is short circuited and how it can be prevented.

Embodiments of the invention are illustrated by way of examples and not by way of limitation in the figures of the accompanying drawings in which like references indicate similar elements. It should be noted that references to "an" or "one" or "some" embodiment(s) in this disclosure are not necessarily to the same embodiment, and such references mean at least one. Additionally, in the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

Overview
Use Case

A bicycle manufacturer wants to integrate an anti-counterfeiting and consumer engagement system with their bicycles. An NFC-based RFID system [FIG. 6] is chosen because of readability with most modern smart phones, i.e. the interrogation devices [602]. In order to make the communication device [604] a part of the bicycle frame [601], resistant to tempering, product use, and still invisible from the outside, the communication device [604] has to be embedded into the frame material [405] itself.

Communication Device

The bicycle manufacturer uses standard ISO-based chipsets [201] and antennas [202] to communicate with the interrogating mobile phones [602]. The antenna size [202] is chosen to ensure a certain read-range, in typical NFC implementations the effective read-range can be up to 10 cm, and the chipset [201] to ensure sufficient memory for bicycle identification purposes.

Placement

A position for the communication device [604] on the bicycle frame [601] is chosen that prevents excessive warping or bending of the antenna [202], for instance, the object's surface diameter on rounded surfaces should be larger than 25 mm. Yet, the positioning should be easily accessible for later scanning by the interrogation device, a mobile phone or tablet [501].

Layering and Molding Process

The communication device [103] is now attached to an insulation layer of poly-carbonate [104] with slightly larger dimensions than the antenna, about 1 mm on each side [202].

During the production process, the placement position is marked in the bicycle frame mold [101]. Into that position, an oversized raisin-infused fiber glass protective layer [102] is placed, followed by the communication device with antenna [103] and insulation layer [104], all smaller than and completely inside the fiber glass layer [102], followed by the raisin-infused carbon fiber layers [105] to the thickness as the rest of the frame.

Finally, expandable tubing [106] is placed inside the mold and the mold is closed.

Resin Heating and Curing of the Carbon Fiber Material

Now the whole mold [520] is heated to a temperature necessary to liquefy the resin [404] particles embedded in carbon [105] and glass fiber [102] layers to eventually harden the carbon and fiber layers into their final shape. The inner-mold tubes [106] are expanded to press the fiber layers [102] against the mold walls with the necessary pressure. The pressure used in production processes is usually comparatively small (200 kPa) and remain well below a pressure that can damage the communication device (1 MPa at least).

The mold [101] is heated to a temperature that liquefies the raisin [404] particles in both carbon [405] and glass fibers [401]. Temperatures range depending on the raisin, but are typically between 90-160° C. The method described here requires the heating temperature to be below the melting temperature of the soldering metal (solder) used to produce the conductors of the communication device [402], typically far above 160° C. For example, standard solder formulations based on tin and lead (63/37) melt at 183° C. and tin and lead solder (50/50) has a melting point of up to 215° C. Lead-free solders melt at around 250° C.

Figure 4:
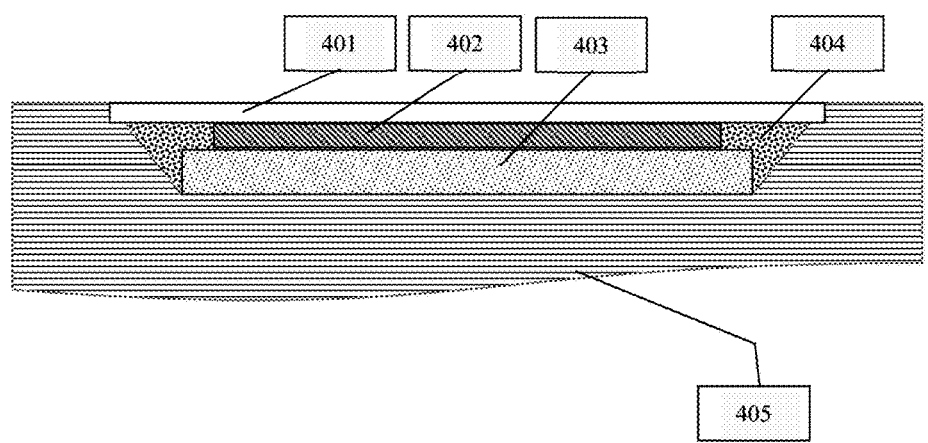
FIG. 4 is an illustration of an integrated communication device in the formed object material.
Figure 5:
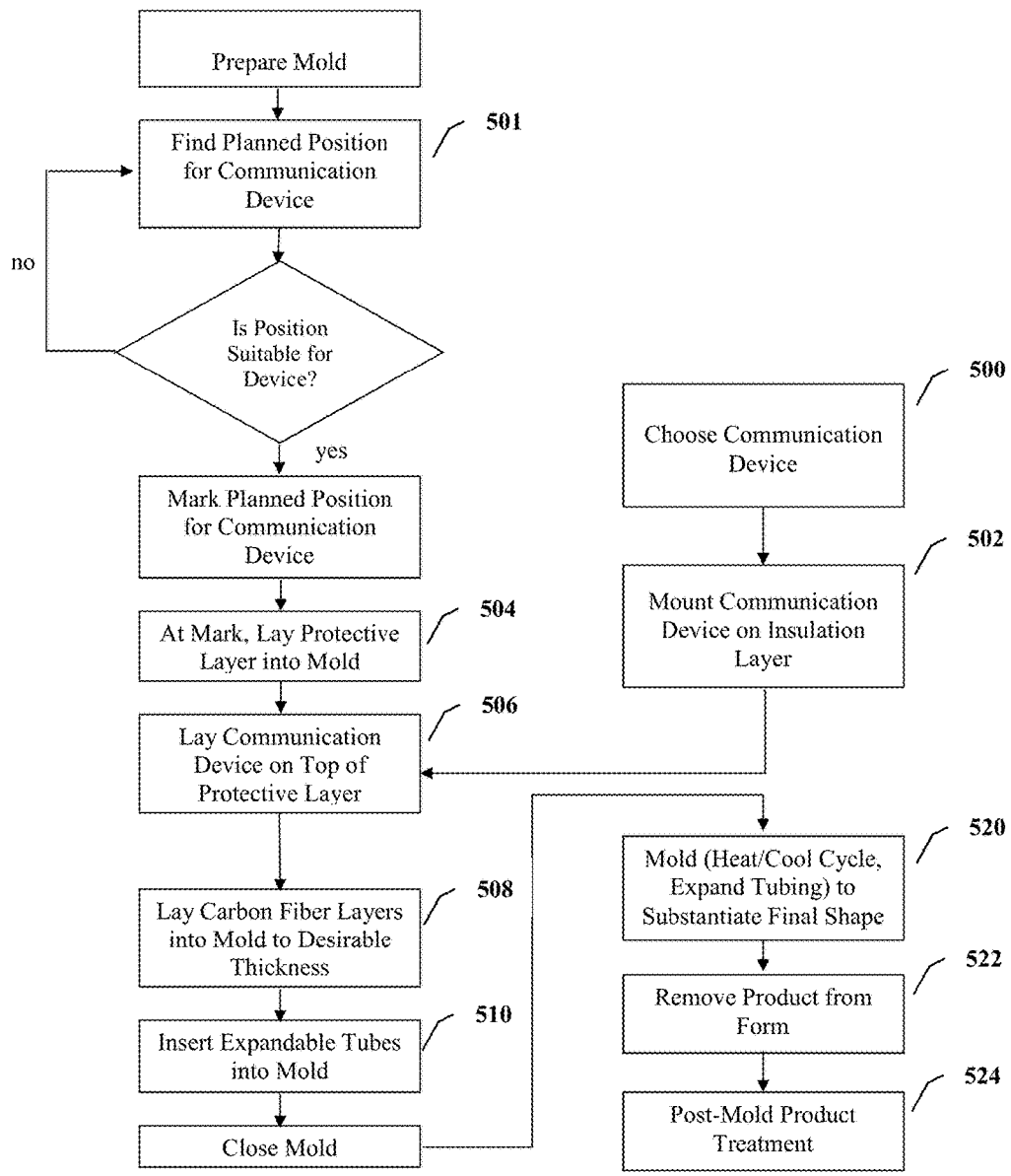
FIG. 5 is a process flow diagram, in accordance with one embodiment of the invention.

The pressure of the expandable tubing [106] now presses the liquefied raisin [404] in between the glass [401] and carbon fibers [405] and around the communication device [402] and insulation layer [403]. The pressure also puts the fiber layers [401, 405] into their final mold shape [101], tightly around the communication device [402], and onto each other [FIG. 4]. The following cooling process hardens the raisin [404] and substantiates the final form or the carbon-fiber based product, including the embedded communication device [402].

Integrated Communication Device Communicates with Interrogating Devices

Figure 6:
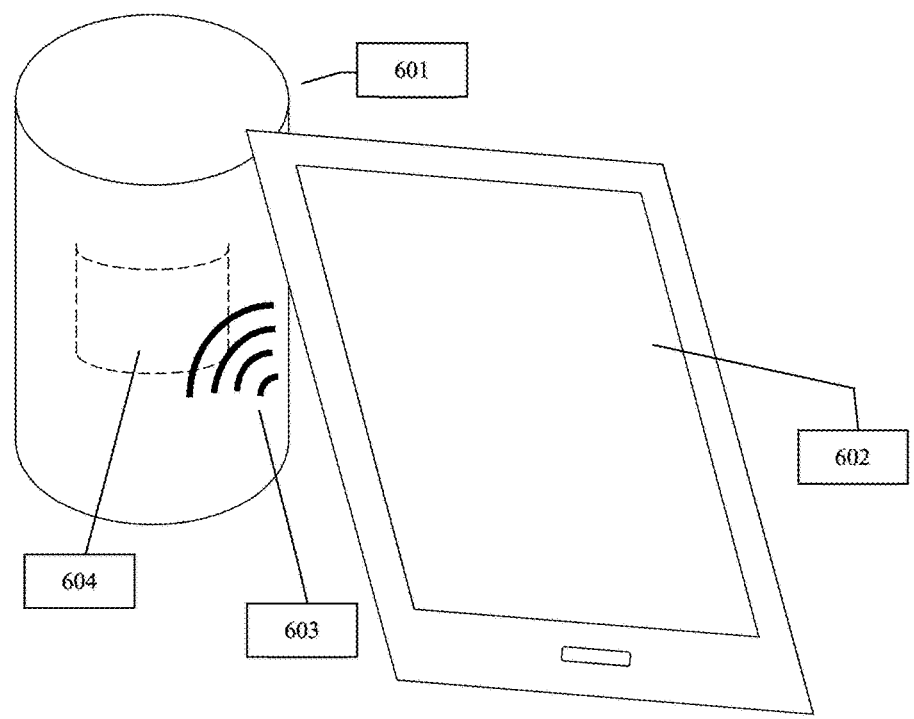
FIG. 6 is an illustration of how an interrogation device communicates with the communication device embedded in the physical object.

After removing the final product from the mold [522], the communication device can now be scanned by an interrogator device like a computer tablet or mobile phone [FIG. 6]. The communication device can even be used in the following production steps to communicate the specifics of the product or advice operators and machines on operational procedures.

Further Processing

Since the communication device is protected by a layer of fiber glass [401], which—compared to carbon fiber [405]—has very little effect on the electro-magnetic field of the interrogating device, the product can even be processed further [524], like application of light abrasion to smoothen the surface. Even additional paint layers are possible while assuring the communication function of the embedded device.

The invention claimed is:

1. A communication device that may be flush mounted on an object made of carbon fiber material comprising:
   a near field communication chipset or radio frequency identification chipset that may be read by an interrogation device;
   an antenna connected to said near field communication chipset or radio frequency identification chipset,
   a carrier film, wherein said near field communication chipset or radio frequency identification chipset and antenna are provided in said carrier film;
   an insulation layer wherein said carrier film containing said near field communication chipset or radio frequency identification chipset and antenna is mounted on said insulation layer to form said communication device; and
   a protective layer covering said communication device, wherein said communication device may be flush mounted on a carbon fiber object and wherein said protective layer is made of non-conductive resin-infused glass fiber.

2. The communication device according to claim 1, wherein said insulation layer is made of non-conductive polycarbonate or ferrite.

3. A method of reducing or preventing the electromagnetic field created by an interrogating device that reduces or interferes with the signaling capability of a communication device flush mounted on a carbon fiber object wherein said method comprises the steps of:
   flush mounting a communication device in a carbon fiber object, wherein the communication device comprises:
      a near field communication chipset or radio frequency identification chipset that may be read by an interrogation device;
      an antenna connected to said near field communication chipset or radio frequency identification chipset;
      a carrier film, wherein said near field communication chipset or radio frequency identification chipset and antenna are provided in said carrier film;
      an insulation layer wherein said carrier film containing said near field communication chipset or radio frequency identification chipset and antenna is mounted on said insulation layer to form said communication device; and
      a protective layer covering said communication device, wherein said communication device is fitted on a carbon fiber object and wherein said protective layer is made of non-conductive resin-infused glass fiber; and
   interrogating said communication device.

4. The method according to claim 3, wherein said insulation layer is made of non-conductive polycarbonate or ferrite.

* * * * *